Jan. 25, 1966     W. B. GEORGE     3,231,166
GUIDE BUSHING FOR STARTER RODS IN SCARFING TORCHES
Filed March 18, 1963

INVENTOR
WILLIAM B. GEORGE
By Donald G. Dalton
Attorney

United States Patent Office 3,231,166
Patented Jan. 25, 1966

3,231,166
GUIDE BUSHING FOR STARTER RODS IN SCARFING TORCHES
William B. George, 2211 W. 8th Ave., Gary, Ind.
Filed Mar. 18, 1963, Ser. No. 265,847
1 Claim. (Cl. 226—127)

This invention relates to scarfing torches and, as indicated, to a bushing assembly for guiding starter rods during feeding movement thereof.

It relates more particularly to an improved guide bushing of the type used in the scarfing torch shown in Patent No. 2,570,386 to Arthur P. Scheller. As shown in this patent, the starter rod is guided through an opening in the scarfer casing by a bushing which has threaded engagement in such opening. This bushing also furnishes a support for one end of a biasing spring that forms part of the starter rod feed mechanism and is compressed with each feeding movement of the starter rod. In the commerical embodiment of such apparatus the changing force of the biasing spring against the guide bushing has resulted in the bushing being pushed out of the casing opening with a thread cutting or stripping action, thereby presenting a troublesome maintenance operation. Such dislodgment of the guide bushing is apparently due to the fact that the casing is fabricated from aluminum and the guide bushing from steel and, since the threads on the bushing are relatively harder compared to those in the casing, the casing threads are worn or cut by the slight axial movement of the bushing which is caused by compression of the biasing spring. The wear or cutting of the casing threads continues until they eventually fail and the bushing is freed for dislodgment by the biasing spring.

One of the principal objects of this invention accordingly is to provide an improved guide bushing assembly which is not subject to failure from a thread stripping action of the character mentioned above. A further object is to provide a bushing assembly of this type which may be used both in new equipment and for the modification or repair of existing equipment.

Other objects and advantages of the invention will become apparent from the following description and the accompanying drawings of a preferred embodiment of the invention. In the drawings.

Figure 1:
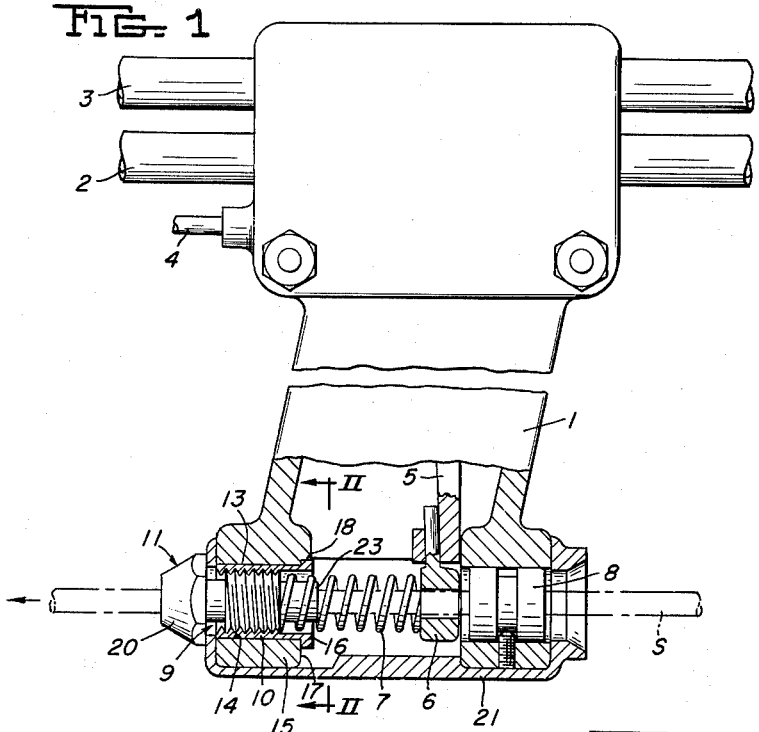
FIGURE 1 is a side elevational view of a casing for the starter rod feed mechanism of a scarfing torch in which a portion of the casing is broken away and shown in vertical section to illustrate the construction of the bushing assembly of this invention.
Figure 2:
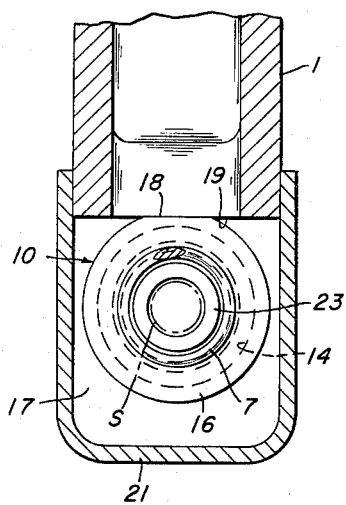
FIGURE 2 is a view taken substantially along the line II—II of FIGURE 1.

As shown and described in greater detail in the patent mentioned above, the scarfing torch in which the guide bushing of this invention is used comprises a casing 1 that is mounted on oxygen and gas feed lines 2 and 3. The casing 1 is cast from aluminum and forms the housing for a starter rod feed mechanism that is operated by a rod 4 which is actuated by a manual control lever (not shown) for the torch. The rod 4 operates a lever 5 that is pivotally supported in the casing 1, and a ring clutch 6 at the bottom of the lever 5 is effective during clockwise movement thereof to feed the starter rod S to the left as viewed in the drawings and to compress the biasing spring 7. After compression in this manner, the biasing spring 7 operates to return the clutch 6 to the position shown in the drawings without imparting axial movement to the starter rod S. Axial feeding movement of the rod S by the clutch 6 is guided by a steel bushing 8 in the casing 1 as shown and described in the patent mentioned above and by the bushing assembly 9 of this invention.

The bushing assembly 9 comprises an internally threaded steel sleeve 10 and an externally threaded plug or guide bushing 11 that has threaded engagement in the sleeve 10 and a central opening 12 extending axially thereof through which the starter rod S has a guided movement. The sleeve 10 has a cylindrical external surface 13 which engages with a press fit in an opening 14 in a bottom portion of the wall 15 of the casing 1. A flange 16 at one end of the sleeve 10 has abutting engagement with a casing wall surface 17 and limits axial movement of the sleeve 10 in the opening 14 in a direction to the left as viewed in the drawings. A portion of the flange 16 is removed to provide a flat surface 18 that has engagement with a ledge 19 projecting outwardly from the casing wall 15 to prevent turning movement of the sleeve 10 in the opening 14 when the plug 11 is tightened therein. The plug 11 is tightened in the sleeve 10 by rotating a flange nut 20 at the outer end of the plug 11, which further operates to clamp a cover 21 against the bottom of the casing. The plug 11 also draws the sleeve 10 into the opening 14 to a position in which its flange 16 is tightly engaged with the wall surface 17 so that there is no relative end play between the sleeve 10 and plug 11. The biasing spring 7 engages an axially facing annular surface 22 at one end of the plug 11 which is arranged about a cylindrical extension 23 that serves to center the spring 7 in the sleeve 10.

Figure 3:
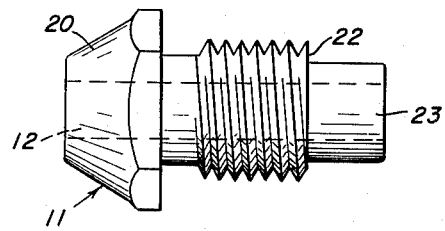
FIGURE 3 is a side elevational view of the guide bushing used in the assembly shown in FIGURE 1.
Figure 4:
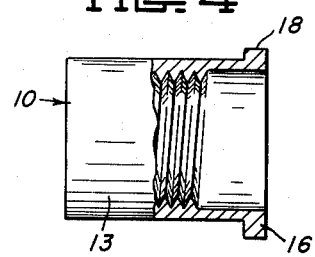
FIGURE 4 is a side elevation of the bushing assembly sleeve.

Since the sleeve 10 and plug 11 are both constructed from the same metal, for example, stainless steel, the threads on these parts have equal strength and variations in the biasing force of the spring 7 due to feeding operation of the clutch 6 are ineffective to loosen the threaded connection therebetween in the manner that takes place where the steel plug 11 has threaded engagement in a casing 1 of softer metal as shown in FIGURE 3 of the patent mentioned above. The bushing assembly of this invention, which is comprised of the sleeve 10 and plug 11, will thus last indefinitely during operation of a scarfing torch. Although such assembly may be installed in new casings 1 that are constructed with openings 14 for the reception of the sleeve 11, it will be apparent that the assembly is adapted for installation in existing equipment. For this purpose, it is only necessary to ream the opening 14 to the diameter of the external surface 13 of the sleeve 10 to allow the guide plug assembly of this invention to be installed therein.

While one embodiment of my invention has been shown and described it will be apparent that other adaptations and modifications may be made without departing from the scope of the following claim.

I claim:

In a bushing assembly for guiding a starter rod through an opening in an aluminum scarfing torch casing of the type having a clutch movable in one direction for imparting axial feeding movement to the starter rod, and a coil spring arranged about said rod for compression by said clutch in response to a rod feeding operation thereof and for biasing the movement of said clutch in an opposite direction relative to said rod, the combination therewith of a steel sleeve received in said opening with a press fit, a flange at one end of said sleeve and engaged with said casing about said opening for holding said sleeve against axial movement in the direction of feeding movement of said starter rod, said sleeve having threads on its internal surface, a steel plug through which said starter rod has its said axial feeding movement guided and having threaded engagement in said sleeve from an opposite end thereof, means including a nut-flange on the outer end of said plug for tightening said sleeve flange against said casing, and an annular surface at the inner end of said plug against which an end of said spring has bearing engagement.

References Cited by the Examiner

UNITED STATES PATENTS

| | | | |
|---|---|---|---|
| 3,786 | 10/1884 | Loner | 308—237 |
| 1,491,873 | 4/1924 | McMurtrie | 285—161 |
| 1,904,180 | 4/1933 | Wagner | 308—237 X |
| 1,967,039 | 7/1934 | Mohr. | |
| 2,324,676 | 7/1943 | Butterfield | 308—236 X |
| 2,570,386 | 10/1951 | Scheller | 158—27.4 |
| 2,649,337 | 8/1953 | Ware | 308—236 X |
| 2,897,022 | 7/1959 | Marola | 308—208 |
| 2,972,002 | 2/1961 | Wayman | 285—161 |

DON A. WAITE, *Primary Examiner.*

ROBERT C. RIORDON, *Examiner.*